United States Patent [19]

Pejcha

[11] 3,737,969

[45] June 12, 1973

[54] CENTERING DEVICE

[75] Inventor: Ivan Pejcha, Santa Clara, Calif.

[73] Assignee: Information Storage Systems, Inc., Cupertino, Calif.

[22] Filed: Apr. 19, 1971

[21] Appl. No.: 135,008

[52] U.S. Cl. .............................. 29/203 P, 29/205 R

[51] Int. Cl. ...................... H05k 13/00, H02k 15/00

[58] Field of Search ..................... 29/203 P, 205 R, 29/205 D, 203 J, 200 P, 200 J, 200 R

[56] References Cited

UNITED STATES PATENTS 3,531,788 9/1970 Brown et al. .................... 340/174.1

*Primary Examiner*—Thomas H. Eager
*Attorney*—Gerald L. Moore and Robert B. Crouch

[57] ABSTRACT

This disclosure relates to a centering device specifically applied to a movable coil and a magnet assembly wherein the members can be centered relative to each other by the interaction of mating parts on the members when the members are moved into abutting position.

4 Claims, 2 Drawing Figures

INVENTOR.
IVAN PEJCHA
BY Gerald L. Moore
ATTORNEY

INVENTOR.
IVAN PEJCHA
BY Gerald L. Moore
ATTORNEY

CENTERING DEVICE

CROSS REFERENCES TO RELATED APPLICATIONS

This invention relates to a carriage mechanism for direct access data storage device similar to that described in U.S. Pat. No. 3,587,075, "Carriage Mechanism for Direct Access Data Storage Device," issued on June 22, 1971, and assigned to the assignee of this application and in U.S. Pat. No. 3,531,788, "Apparatus for Loading and Unloading a Slider Assembly," issued on Sept. 29, 1970.

BACKGROUND OF THE INVENTION

1. Field of the Invention

The invention relates to a means for centering the coil to the center pole of a linear motor or similar device.

2. Description of the Prior Art

Electromagnetic linear motors have been used in many applications and in particular are being used presently in direct access storage devices which record data for use in computer systems. Such devices employ a stack of rotating disks as the storage media positioned in proximity with an access mechanism which includes an array of read/write heads, a supporting baseplate and a linear motor for moving the access mechanism and heads across the surface of the rotating disks. Thus, the access mechanism is mounted on an extension of a radius of the recording disks to facilitate movement of the read/write heads radially of the disk surfaces.

The heads must be positioned and repositioned at selected positions or tracks on the disk surfaces with a high degree of accuracy since the tracks are only a few thousandths of an inch apart. Additionally, the mechanism for moving the heads must have a small mass to reduce the inertial forces. To move the heads, an electromagnetic linear motor is fixed to the access mechanism. The electromagnetic linear motor comprises a stationary magnet assembly and an interfitting movable electrical coil which is attached to the access mechanism. The coil moves in a magnetic air gap which is a permanently fixed concentric space between a center pole and the front plate of the magnet assembly. For efficiency of the linear motor it is essential to design the gap as small as possible or have minimum clearances between the coil and the walls of the gap. Thus, it is very important that the coil be accurately centered relative to the center pole or the center of the air gap. The coil is mounted on the access mechanism for movement parallel to the axis of the center pole or the gap. However, during initial assembly and subsequently during maintenance, the coil must be rather frequently assembled and disassembled with the access mechanism. In the past, upon re-assembly, the coil was generally placed about the center pole and shims or other devices inserted between the outside diameter of the gap and coil to approximately center the coil prior to being tightened into position. Not only is such a process time consuming, but it is very inaccurate and depends strictly upon the dexterity of the person doing the maintenance as to whether the coil is actually close to being centered. It is the alleviation of this problem to which the present invention is directed.

SUMMARY OF THE INVENTION

A centering device particularly adapted for linear motors and the like in which first and second relatively movable members are mounted to be moved in a first direction towards and away from a juxtaposed position, one of said members being movable in a second direction for alignment of the members and having releasable means for holding said one member against movement in the second direction, said members having mating parts which contact when in the juxtaposed position such that the releasable means can be released, the members moved to the juxtaposed position and alignment of the members accomplished by alignment of the mating parts.

DESCRIPTION OF A PREFERRED EMBODIMENT

Figure 1:
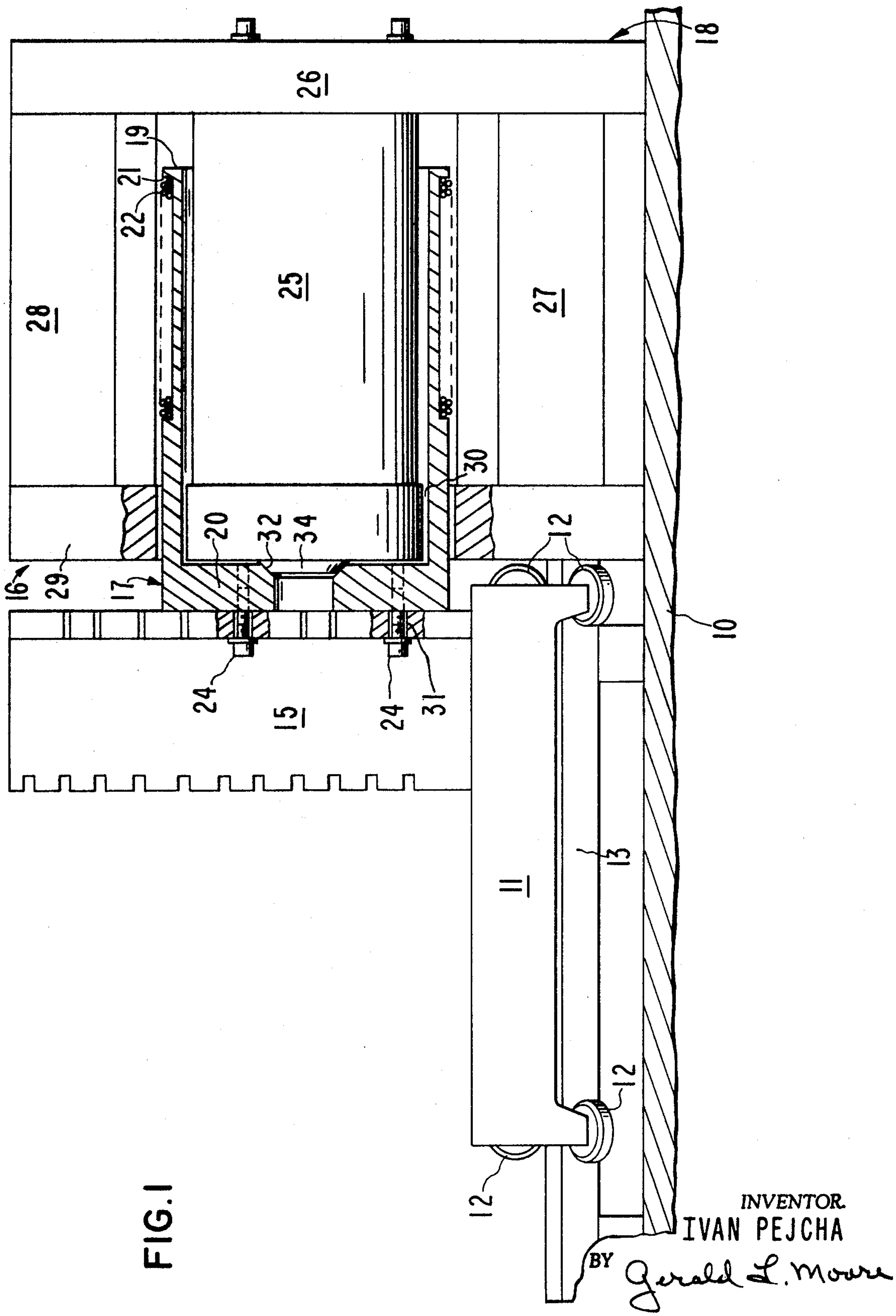
FIG. 1 is a side view, partially in cross-section showing one embodiment of the invention as applied to a linear motor used in a direct access storage device
Figure 2:
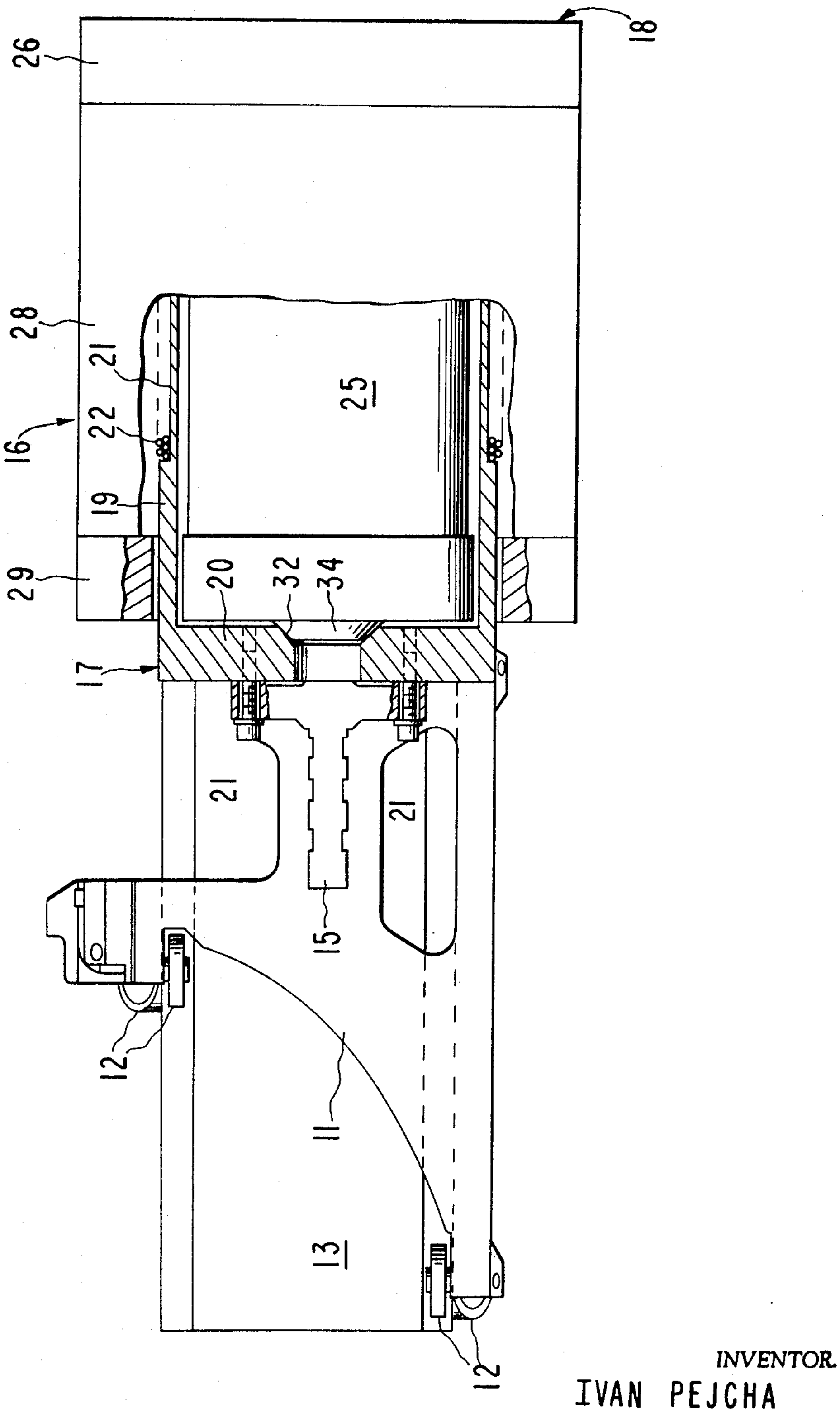
FIG. 2 is a top view, partially in cross section, of the device shown in FIG. 1.

In the Figures is shown a carriage assembly for use in direct access storage devices similar to that described in the patent application referenced heretofore. The carriage assembly is mounted on a baseplate 10 and serves to move the read/write heads (not shown) across the surface of recording disks (not shown) which ordinarily are positioned to the left of the drawing. For such movement a carriage 11 is supported on a plurality of ball bearings 12 which ride on parallel surfaces of a rail 13 to permit movement in a first direction parallel to the baseplate. A support or T-block 15 is mounted on the carriage and extends vertically to hold the various read/write head assemblies.

Movement of the carriage is effected by an electromagnetic linear motor 16 comprising an electrical coil 17 fixed to the T-block and a magnet assembly 18 mounted on the baseplate 10 flush with the right face of the rail 13. The coil consists of a non-magnetic cylinder 19 having one end closed by an end plate 20 and being recessed on the outer surface 21 to receive a wound electrical wire 22. The coil is mounted to the T-block by bolts 24 which extend through arms of the T-block and thread into the end plate 20.

Extending towards the open end of the cylinder 19 is a center pole 25 fixed to a backplate 26 and permanently assembled to provide a concentric air gap 30 between itself and the circular hole in the front plate 29. Fixed between the backplate 26 and front plate 29 parallel to the pole are a bottom magnet 27 and a top magnet 28 which complete the magnetic circuit for the linear motor.

In operation, the permanent magnets 27 and 28 serve to generate a strong magnetic field across the air gap 30 to intersect the coil 22. Thus, in the usual manner, as an electrical potential is applied to the wire 22 through terminal leads (not shown) resulting in current flow through the wire, the coil will be forced to the left or right in the drawing in a first direction parallel to the baseplate. The direction of movement of the coil will depend upon the direction of the current flow therethrough. For movement of the carriage assembly, the coil is energized to effect movement to the left from the position shown in the drawings until the position at which the carriage is desired to be stopped is approached and the current thereafter is reversed to effect braking action on the coil assembly to stop the carriage. Similarly, movement is effected in the opposite direction by first energizing the coil with current flow in the opposite direction. For a more complete description of the operation of such a positioning device, reference can be made to the previously identified patent.

During the initial assembly of the carriage and linear motor assembly, and thereafter during maintenance, it is necessary to closely align the coil to be concentric with the pole or the air gap. While the drawing illustrates the relative position of the parts, in actuality the clearance between the members is much smaller. Also, any contact between the coil and walls of the gap can result in a malfunction of the positioning apparatus as well as damage to the coil. In the past, alignment of the members has been difficult and it is to the solving of this problem that the subject invention is directed.

In accordance with the present invention, the coil assembly is mounted so that it can be repositioned on the T-block in a second direction laterally of the normal or first direction of movement of the coil. When the coil is moved to the juxtaposed position, mating parts on the members contact and cause precise alignment of the coil to the pole or air gap such that by thereafter fixing the coil assembly in that position, the coil is quickly and accurately positioned for proper operation.

Accordingly, the coil is held in place by the bolts 24 which extend through openings 31 in the T-block, which openings are sufficiently large to permit movement of the coil in the second or lateral direction when the bolts are loosened. Machined into the end plate 20 is a conical recess 32 which mates with a frustrated conical projection 34 fixed to the extending end of the pole when the coil is in the juxtaposed position relative to the end plate. While the mating surfaces can be of any configuration, it is recommended that they be conical or inclined such that movement of the coil to the contact position will force lateral movement of the coil to properly align to the center pole or the air gap.

The invention claimed is:

1. A centering device, comprising a support first and second members mounted on said support, at least one of said members being movable in a first direction towards the other member such that said members are in a juxtaposed position, one of said members being also movable in a second direction laterally of the first direction, releasable means for holding the one member against movement in the second direction, and said members having mating parts which have surfaces to indicate alignment of the members when the members are in the juxtaposed position such that the members can be moved in the first direction to the juxtaposed position; then by release of the releasable means, said one member will be moved in the second direction by a force imparted by the mating surfaces for alignment of the members as indicated by the mating parts.

2. A centering device as defined in claim 1, wherein said mating parts have interfitting beveled surfaces which contact when the members are moved to the juxtaposed position.

3. A centering device as defined in claim 1 wherein said members comprise a coil and a center pole of an electromagnetic motor.

4. A centering device as defined in claim 2 wherein said members comprise a coil and a center pole of an electromagnetic motor.

* * * * *